(12) United States Patent
Robertson et al.

(10) Patent No.: US 7,712,282 B2
(45) Date of Patent: May 11, 2010

(54) BRACE ASSEMBLY HAVING DUCTILE ANCHOR

(75) Inventors: Thad Scott Robertson, Boise, ID (US); Glen Robak, Meridian, ID (US)

(73) Assignee: Weyerhaeuser NR Company, Federal Way, WA (US)

( * ) Notice: Subject to any disclaimer, the term of this patent is extended or adjusted under 35 U.S.C. 154(b) by 274 days.

(21) Appl. No.: 11/863,065

(22) Filed: Sep. 27, 2007

(65) Prior Publication Data

US 2009/0084056 A1 Apr. 2, 2009

(51) Int. Cl.
*E04B 1/38* (2006.01)
*E04C 5/00* (2006.01)

(52) U.S. Cl. .................... 52/712; 52/702; 52/293.3; 403/232.1; 403/237

(58) Field of Classification Search ............ 52/702, 52/712, 713, 714, 23, 293.3, 295; 403/232.1, 403/237
See application file for complete search history.

(56) References Cited

U.S. PATENT DOCUMENTS

| 4,124,962 A * | 11/1978 | Lancelot et al. ............ 52/702 |
| 4,192,118 A * | 3/1980 | Gilb ........................... 52/714 |
| 4,869,467 A * | 9/1989 | Kellison ...................... 256/64 |
| 4,875,314 A * | 10/1989 | Boilen ........................ 52/167.1 |
| 5,375,384 A * | 12/1994 | Wolfson ....................... 52/295 |
| 5,979,130 A * | 11/1999 | Gregg et al. .................. 52/295 |
| 6,006,487 A * | 12/1999 | Leek ............................ 52/698 |
| 6,112,495 A * | 9/2000 | Gregg et al. .................. 52/712 |
| 6,513,290 B2 * | 2/2003 | Leek ............................ 52/295 |
| 6,550,200 B1 * | 4/2003 | Mueller ....................... 52/296 |
| 6,668,508 B2 | 12/2003 | Boone |
| 6,941,712 B2 * | 9/2005 | Sukup et al. ................ 52/293.3 |
| 7,506,479 B2 * | 3/2009 | Pryor ......................... 52/293.3 |
| 7,513,083 B2 * | 4/2009 | Pryor et al. .................. 52/167.4 |
| 2002/0020137 A1 * | 2/2002 | Commins ..................... 52/712 |
| 2006/0037256 A1 * | 2/2006 | Pryor ......................... 52/167.1 |

* cited by examiner

*Primary Examiner*—Brian E Glessner
(74) *Attorney, Agent, or Firm*—Rachael Vaughn

(57) ABSTRACT

A shear brace assembly is provided which laterally braces wall lines within a structure, such as a house or other residential construction, while also providing vertical and out-of-plane load carrying capacity. The assembly consists of one or more wood-based panel(s) which are rigidly connected to concrete, masonry or wood support material directly below or above the shear brace assembly bearing surface. The term "wood-based" should be interpreted to mean that the panel may be constructed from a natural wood, or partially or wholly from an engineered wood, such as Timberstrand®, Parallam®, or the like. Ductile anchorage assemblies are used below, and in some applications, above the individual panels.

16 Claims, 9 Drawing Sheets iSB Ductile Anchor (Side Veiw)

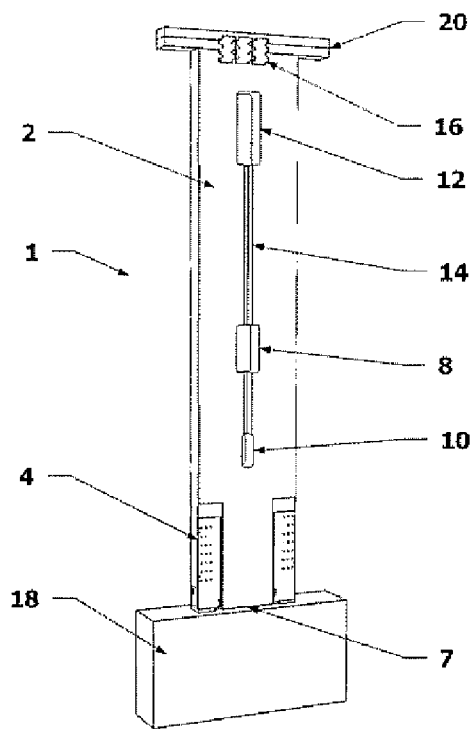
Figure 1: Stand Alone Application with Flat Top (Back View)
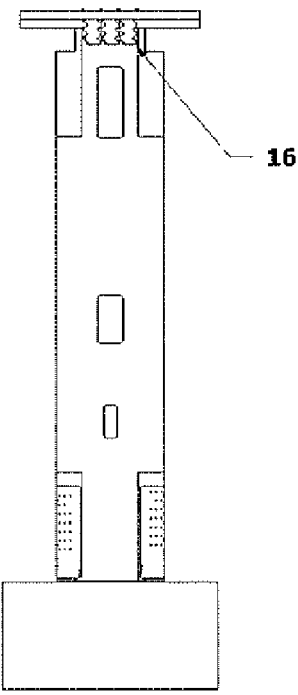
Figure 2: Stand Alone Application with Notched Top (Front View)

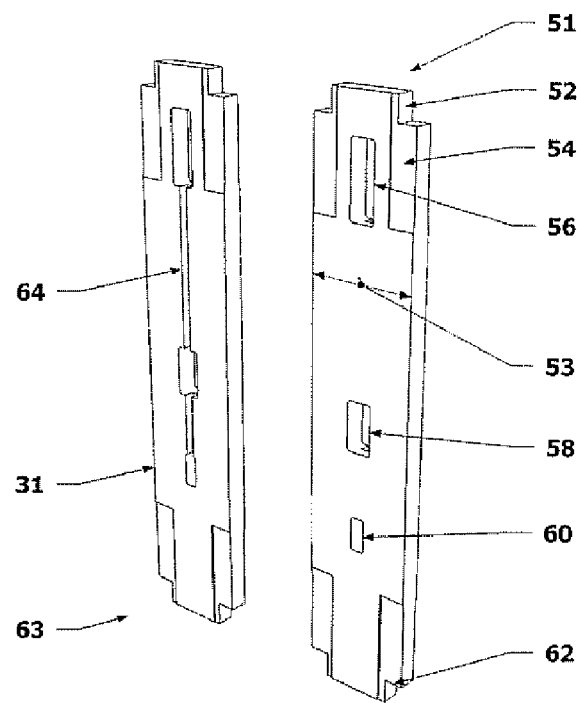
iSB (Back Side)  iSB (Front Side)
Figure 3: iSB Panel Only (Notched Top)
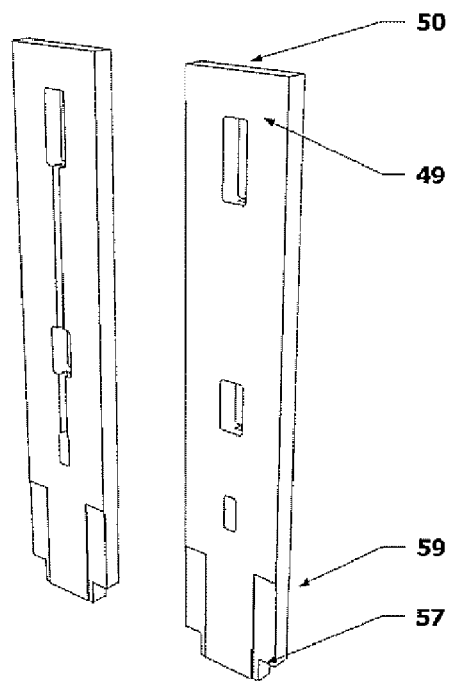
iSB (Back Side)  iSB (Front Side)
Figure 4: iSB Panel Only (Flat Top)

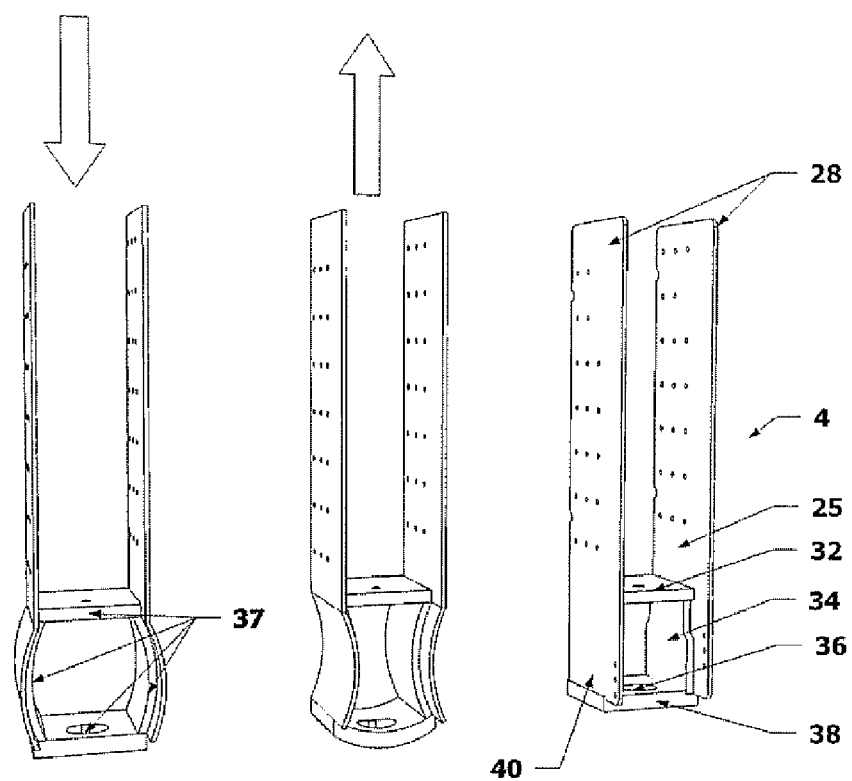
Figure 5: iSB Ductile Anchor Assembly (Isometric View)
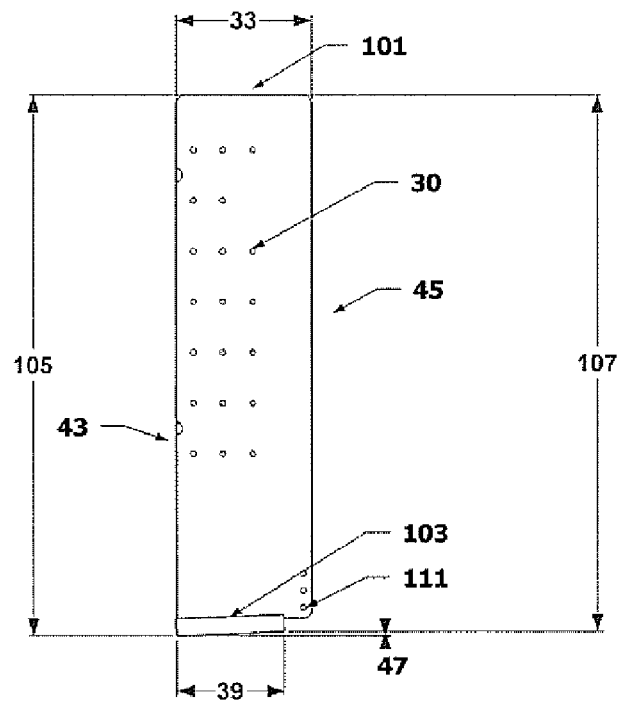
Figure 6: iSB Ductile Anchor (Side View)

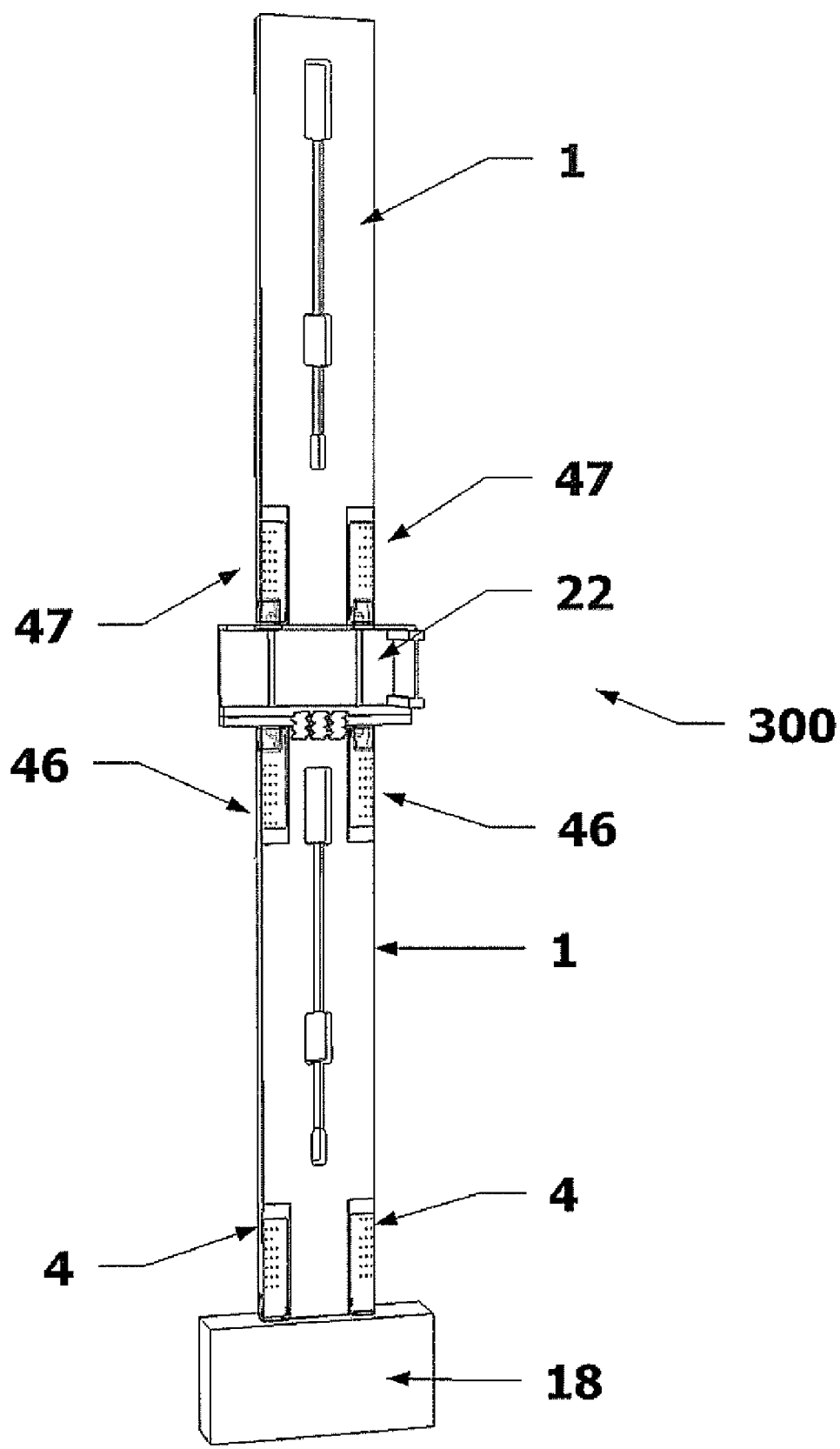
Figure 7: iSB Stacked Panel Application

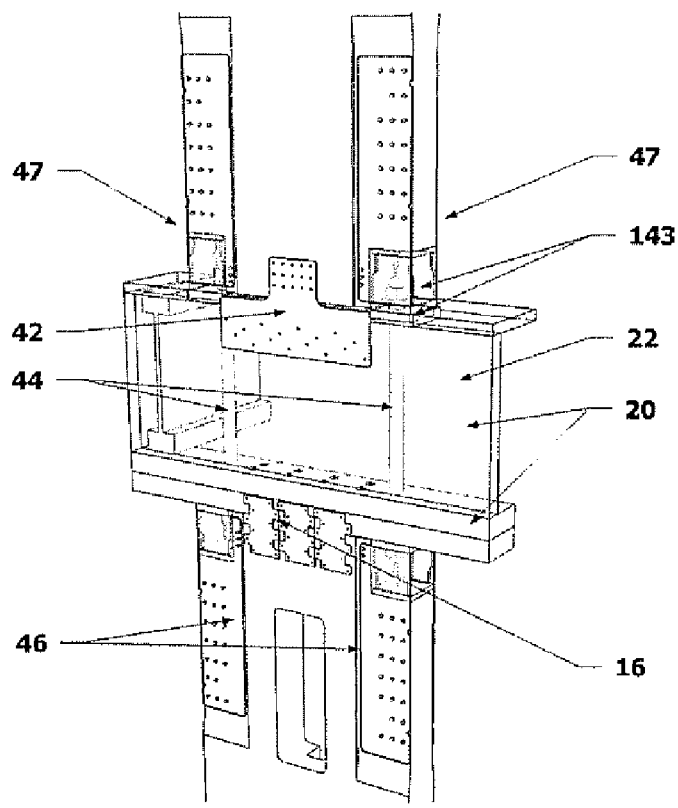
Figure 8: Multi Story Kit Assembly
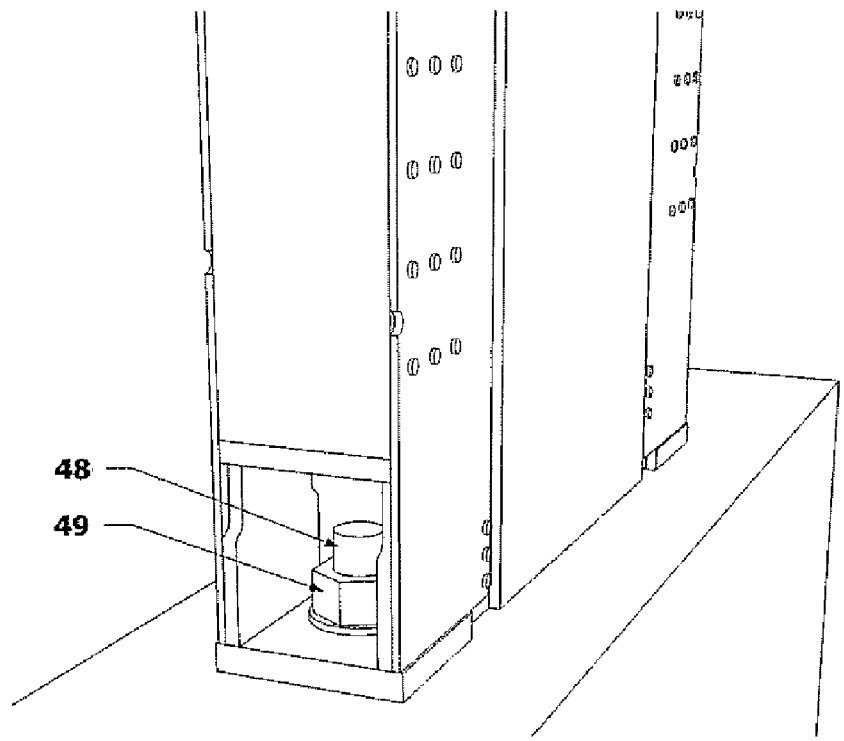
Figure 9: Ductile Anchor Assembly

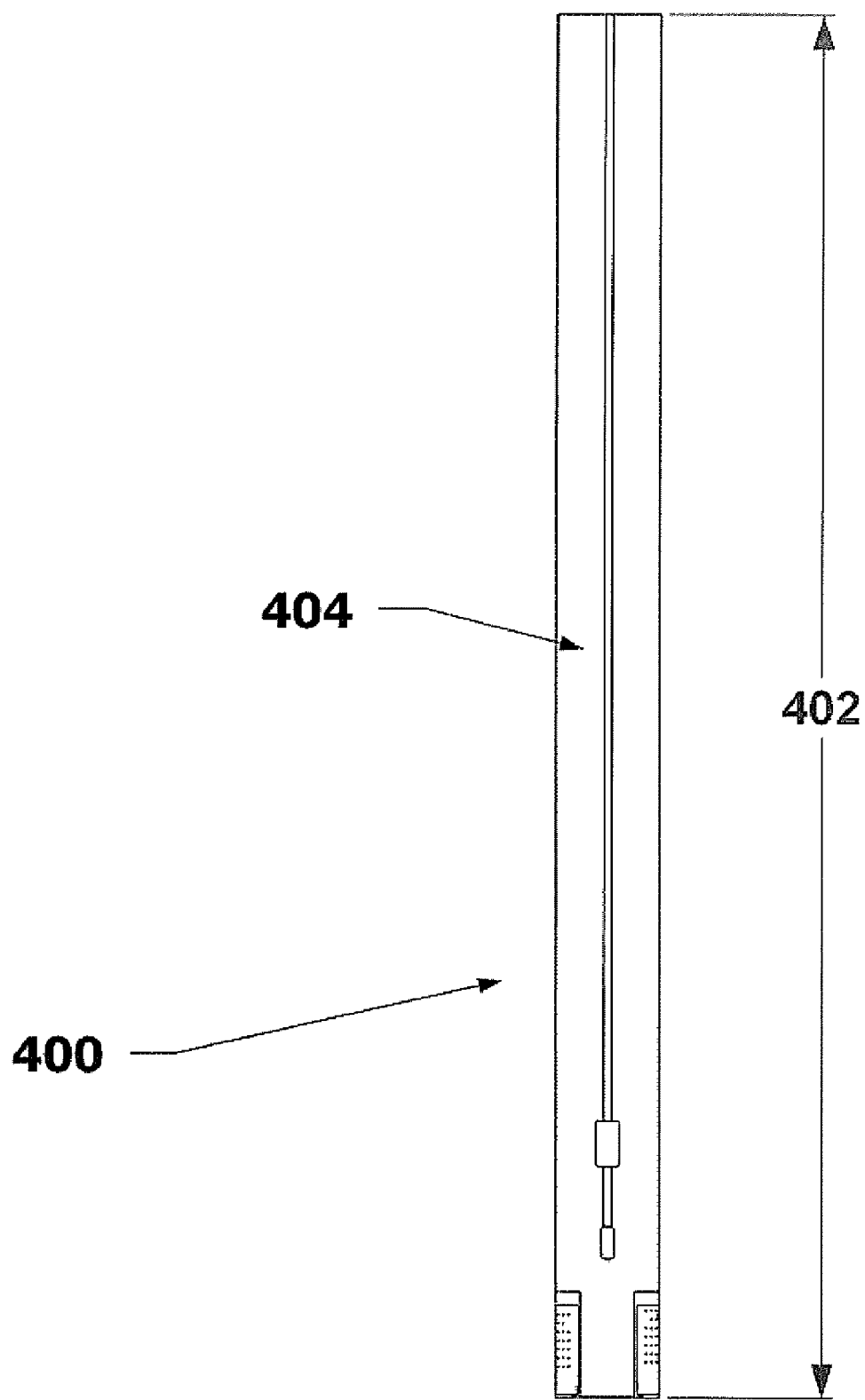
Figure 10: Tall Wall Assembly

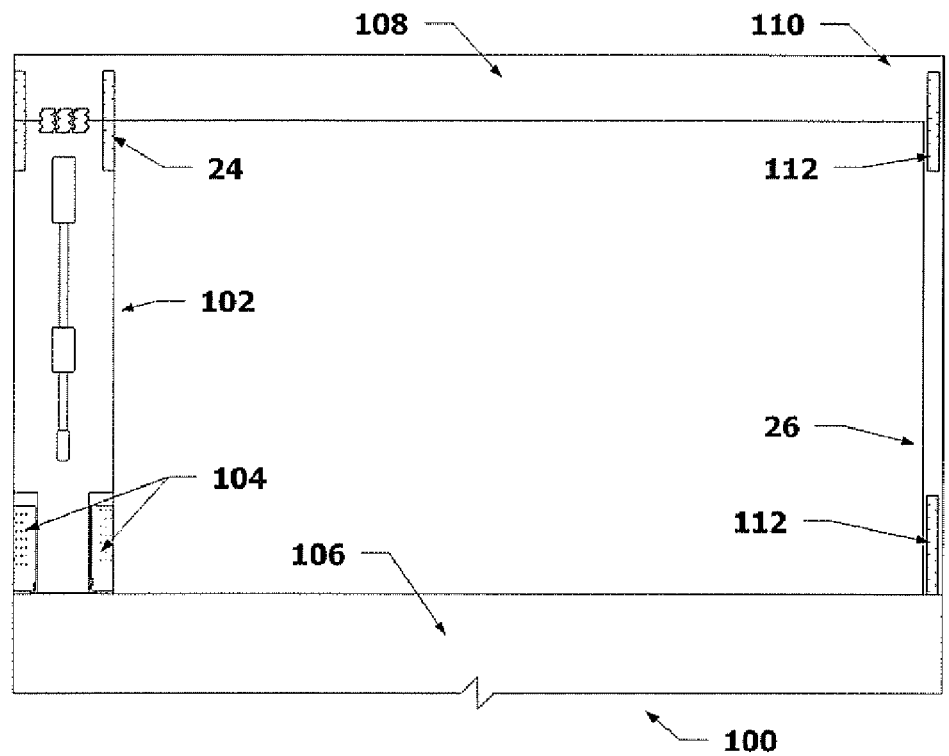
Figure 11: Single Portal
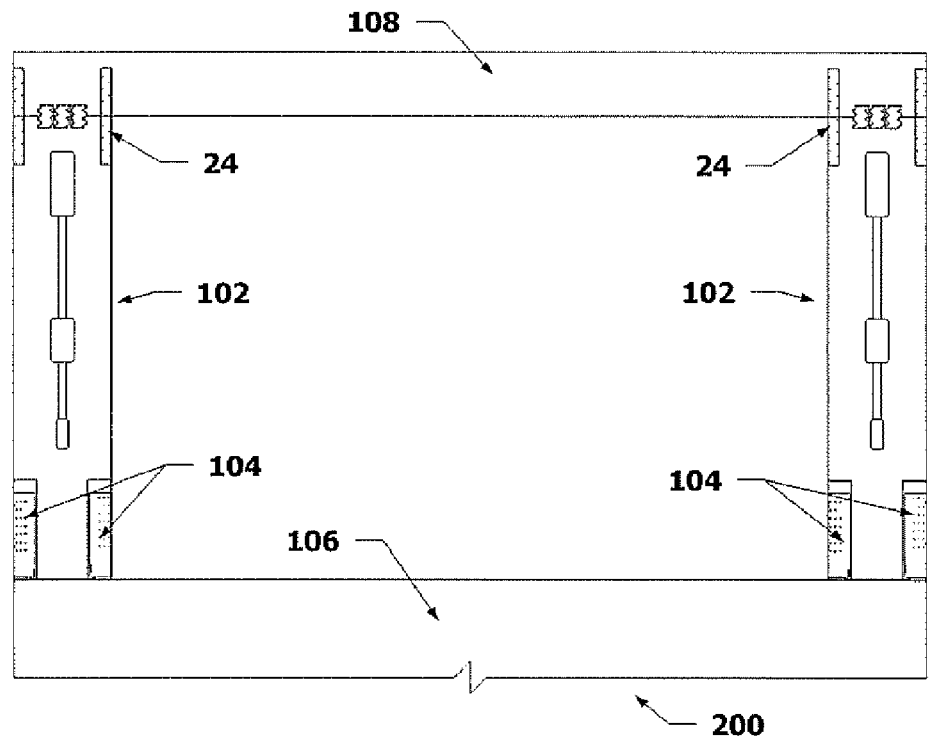
Figure 12: Double Portal

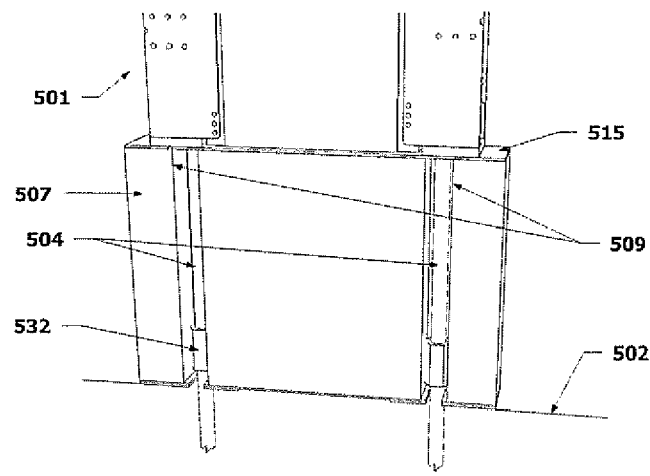
Figure 13: Raised Floor Kit (Back View)
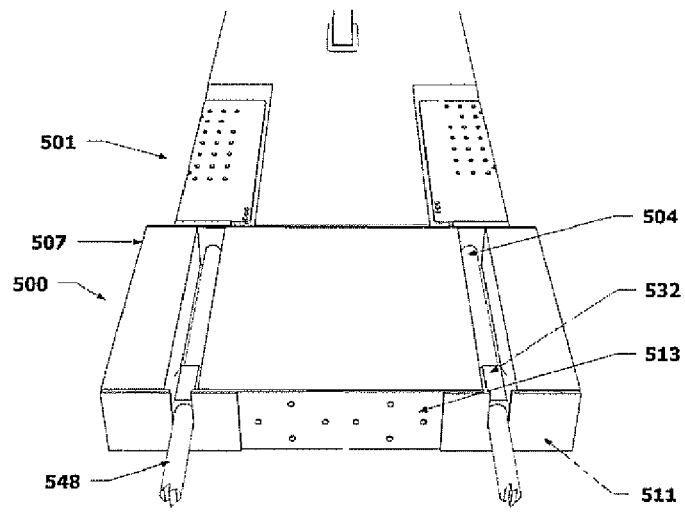
Figure 14: Raised Floor Kit (Inside View From Below)
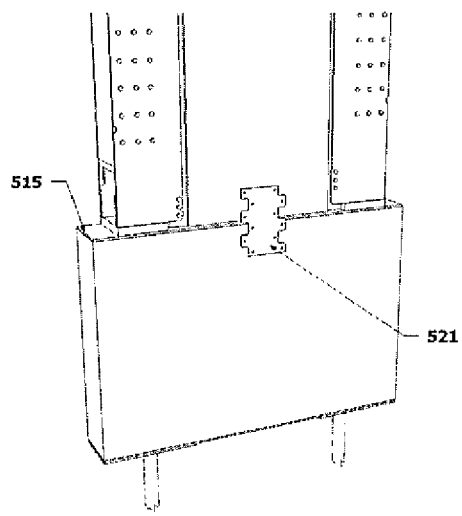
Figure 15: Raised Floor Kit (Front View)

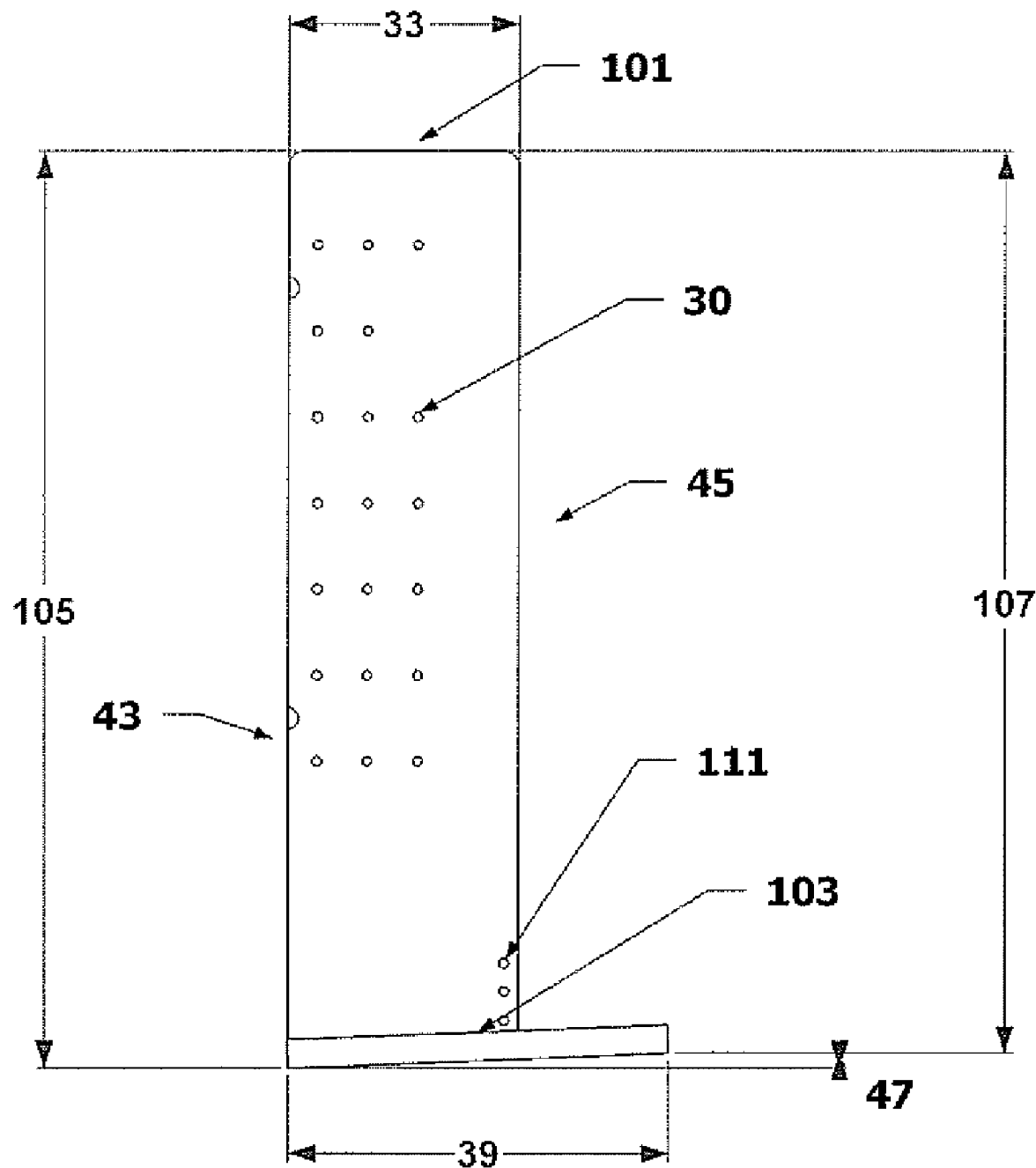
Figure 16: iSB Ductile Anchor (Side Veiw)

BRACE ASSEMBLY HAVING DUCTILE ANCHOR

FIELD OF THE INVENTION

This invention relates generally to a brace assembly having a ductile anchorage assembly.

BACKGROUND OF THE INVENTION

Typical building frame construction includes a roof assembly supported by an attached frame. The frame typically includes a plurality of vertically oriented studs attached between upper and lower plates. Inner and outer siding materials are attached to the frame. In a typical residential building, framing is accomplished by employing lumber and wood products.

Lateral forces applied to the wall, which may occur as a result of high winds or earthquakes, can cause the wall to laterally deform in the plane of the wall (in the direction of the load). Excess movement of the upper section of the wall relative to the anchored lower section of the wall can result in damage to the structure, which can be catastrophic.

A variety of designs have been developed for resisting lateral forces imposed on structures. One method for resisting lateral forces imposed on a building includes the installation of 4 foot by 8 foot sheets of material such as oriented strand board (OSB) or plywood to the frame exterior such that it spans over multiple studs and is attached to the upper and lower plates. A lateral force applied to the wall parallel to the wall line is therefore transferred through the sheet material to the bottom plate and the foundation of the structure. This reduces the tendency of the wall to deform in-plane of the wall line. Lateral and vertical forces are typically resisted by the wall-to-foundation interface with a plurality of anchor bolts, tie-downs and/or perpendicular framed shear walls.

However, a need still exists for lateral force resisting elements within a wall line which are narrower than the typical 4'×8' sheets of OSB or plywood, but have similar performance characteristics. Desired characteristics of the lateral force resisting element include strength, stiffness, ductility and damping to resist lateral loads imposed on the wall line. Moreover, a need exists for lateral force resisting elements having the capacity to resist vertical and out-of-plane loads. The intent is for the lateral force resisting element not to fail in a brittle and catastrophic manner, but rather a gradual, ductile and life-safety promoting fashion when subjected to static or cyclic lateral loading conditions.

BRIEF DESCRIPTION OF THE DRAWINGS

The embodiments of the present invention are described in detail below with reference to the following drawings, FIG. 1 illustrates a perspective view of a brace assembly in an embodiment of the present invention;

FIG. 2 illustrates a front plan view of the brace assembly of FIG. 1;

FIG. 3 illustrates side perspective views of a panel in an embodiment of the present invention;

FIG. 4 illustrates side perspective views of a panel in an embodiment of the present invention;

FIG. 5 illustrates perspective views of a ductile anchorage assembly in an embodiment of the present invention;

FIG. 6 illustrates a side view of the ductile anchorage assembly;

FIG. 7 illustrates a stacked brace assembly application in an embodiment of the present invention;

FIG. 8 illustrates a side perspective view of a multi-story kit in an embodiment of the present invention;

FIG. 9 illustrates a side perspective view of a ductile anchorage assembly in an embodiment of the present invention;

FIG. 10 illustrates a side view of the panel in an embodiment of the present invention;

FIG. 11 illustrates a front plan view of a single portal with post configuration in an embodiment of the present invention;

FIG. 12 illustrates a front plan view of a double portal configuration in an embodiment of the present invention;

FIG. 13 illustrates the brace assembly attached to a raised floor kit in an embodiment of the present invention;

FIG. 14 illustrates a perspective view of the brace assembly attached to a raised floor kit in an embodiment of the present invention;

FIG. 15 illustrates a perspective view of the brace assembly attached to a raised floor kit in an embodiment of the present invention; and FIG. 16 illustrates a side view of a ductile anchorage assembly in an embodiment of the present invention.

DETAILED DESCRIPTION OF THE INVENTION

The present invention is a braced panel assembly which laterally braces wall lines within a structure, such as a house or other residential construction, while also providing vertical and out-of-plane load carrying capacity. The assembly consists of one or more wood-based panel(s) which are rigidly connected to concrete, masonry or wood support material directly below the braced panel assembly bearing surface. The term "wood-based" should be interpreted to mean that the panel may be constructed from a natural wood, or partially or wholly from an engineered wood, such as Timberstrand®, Parallam®, or the like.

The brace assembly configurations consist of at least the following embodiments: Stand Alone (see FIGS. 1 & 2); Portal (see FIGS. 9 & 10); Stacked, or Multiple Story (see FIG. 7); and Tall Wall (see FIG. 10). The assemblies may include a Raised Floor Kit (RFK), as shown in FIGS. 13-15, when installed, for example, over a platform floor system supported by concrete, or a Multiple Story Kit (MSK) as shown in FIGS. 7 and 8 when installed, for example, over a platform floor system supported by a framed wall.

The wood-based portion of the brace assembly (i.e., the panel or frame) consists of a solid piece of material (FIGS. 3 & 4) cut or formed to a specific shape. The specific shape of the panel accommodates the fit of ductile anchors installed at a bottom end and, where applicable, a top end of the member. The panel may also have notches and side routing, as well as multiple holes and chases. When utilizing an engineered wood, such as, for example, Timberstrand® material, the requirement for wood shrinkage compensation devices may be eliminated due to higher dimensional stability than natural wood. The panels may be, in certain embodiments, 8" to 36" wide, 3½" to 5½" in thickness and range from 78" to 360" in length.

Referring to FIG. 1, the brace assembly 1 may have a panel 2 which may be constructed from a wood-based material. The panel 2 may be rigid and may have an upper opening 12, a mid height opening 8 and a lower opening 10. The openings may be linearly positioned along a face of the panel 2. As stated above, the openings accommodate wiring and plumbing demands for wall construction. A utility chase 14 may be provided on the panel 2 between each of the openings. It should be noted that the positioning of the openings and chase or the sizing of the same should not be limited by the example provided in FIG. 1 but may also include any positioning or sizing contemplated by one of ordinary skill in the art which maintains structural integrity.

The panel 2 may have a variety of shapes. For example, as seen in FIG. 3 and FIG. 4 (showing front and back faces), panel 31 may have notching, such as a top notch 52 at a top end 51. A rout 54 may also be provided adjacent the top end 51 or bottom end 63. Openings 56, 58, 60 are provided along the length of the panel 31 as well as a chase 64 along one face. A bottom notch 62 is provided at a bottom end 63. While a width 53 for the panel 31 may be in a range from 8 inches to 36 inches, a width for the notches 52, 62 may be in a range from, for example 3 to 8 inches.

In another embodiment, a panel 49 may have a linear, or flat, top end 50 and may have a notch 57 at an opposite end 59. In yet another embodiment (not pictured), the flat end may be adjacent a bottom end and a notch may be provided at the top end. Referring again to FIG. 1, the brace assembly 1 may connect to, for example, adjacent framing 20 via a fastener 16, such as for example, a shear clip or other mechanical fasteners. In another embodiment, the brace assembly may attach to a foundation 18 which may be constructed from, for example, wood, concrete, or the like.

Referring now to FIGS. 5 and 6, a ductile anchor assembly 4 is provided with a combination of metal components and is attached to the panel 2, 31 at a bottom or top end. The anchor assembly 4 for the brace has side plates 28 which contact opposite faces of the panel 2, 31. The plates 28 are attached to a bottom plate configuration 37 (an inner-tube) to form a "U"-shape. The bottom plate configuration 37 comprises a bottom plate 38, top plate 32, and support plates 34. These components will be described in more detail below. As can be seen in FIGS. 12, and 7, the anchor assembly 4 fits over a bottom end 7 of the panel 2 or top of panel 1 over a notched area and is attached to the panel 2 via, for example, mechanical fasteners.

The plates 28 may be greater or less in width 33 than the width 39 of the bottom plate 38, thereby extending beyond or within the width 39 of the bottom plate, as seen in FIGS. 6 and 16. The side plates 28 may have a length in a range from 8 inches to 48 inches. The bottom plate 38 may have a length, for example, in a range from 2 inches to 8 inches. The bottom plate 38 may have a width 39 in a range from 2 inches to 18 inches.

The side plate 28 may have edges 101, 103 which are non-parallel. For example, the edge 103 may be slanted at an angle in a range from 0.01 degrees to 10 degrees in a direction from an outer edge 43 to an inner edge 45. Put another way, a length of the side plates 28 may taper from the outer edge 43 to the inner edge 45 such that a length 105 adjacent the outer edge 43 is greater than a length 107 adjacent an inner edge 45. Because the edges 101, 103 are non-parallel, a space is created between the edge 103 and, for example, the foundation 18, when the brace assembly 1 is attached to the foundation 18. The slant, or taper, at the edge 103 ensures that the outer edge of the ductile anchor bearing surface is in contact with the bearing surface with a slight, pre-loaded condition. The small gap 47 created by, for example, the 0.01 degree to 10 degree slant in bearing surface is closed when the anchor bolt nut 48 (see FIG. 9) is tightened, creating a pre-loaded condition at the foundation 18 or the bearing surface 108. This pre-loaded condition ensures predictable stiffness and ductility during the performance of the brace assembly.

FIGS. 6 and 16 provides a side view of the anchor assembly 4. The plates 28 contain mechanical fastener holes 30 which may be positioned closer to the outer edge 43 than the inner edge 45. The holes 30 may have any shape, including round, oval, diamond, or the like. The given shape may enhance ductile performance characteristics of the assembly. However, the positioning of the holes 30 may be selected as deemed appropriate by one of ordinary skill in the art. The anchor assembly may be constructed from, for example, steel, aluminum, or ductile composites.

The top plate 32 extends between the side plates 28. In addition, support plates 34 are provided on inner surfaces 25 of the plates 28. The complete, "U" shaped, anchorage assembly 4 has a hole 36 within the bottom plate 38 for attachment to the foundation below with anchor bolts.

The vertical plates and inner "tube" 37 (the resulting shape from the collection of the top, support and bottom plates) of the assembly act as tension members as well as compression members, transferring the overturning forces directly to, for example, the concrete surface below. The vertical legs and inner "tube" 37 are designed to deform in tension and compression under a specific loading stress as shown in FIG. 5 and eventually transition from a rigid state to a ductile state. The vertical legs and inner "tube" assembly create load resistance as well as designed energy dissipation as the assembly deforms as the panel assembly resists cyclic loading. The outer bearing edge 43 of the anchorage assembly 4 may be slightly lower than the inner edge 45 which ensures the outer edges are always in contact with a corresponding bearing surface 106 or the foundation 18. The holes 111 in the lower portion of the side plates 28 accommodate mechanical fasteners to resist shear loads imposed on the brace assembly 1. The anchor assemblies 4 may work in pairs, thus two anchorage assemblies may be utilized per brace panel application.

In an embodiment, the brace assembly has a "stand alone" configuration, as seen in FIGS. 1 and 2. This configuration includes the brace panel 1 attached to ductile anchors 4. An anchor bolt 48 (see FIG. 9) is installed at the bottom of the brace assembly 1 to resist overturning moments. A fastener, such as a shear clip 16, is used to attach the brace to the adjacent framing to resist horizontal shear. This type of configuration may be used in applications such as, for example, a single story construction.

In other embodiments, seen in FIGS. 11 and 12 the brace assembly has a portal-type configuration. The brace portal assembly 100, 200 consists of a brace panel 102 having ductile anchors 104 attached at a bottom end only. Anchor bolts (not pictured) connect the brace panel 102 to the bearing surface 106. A header 108 may be rigidly connected to the top of the panel 102 by a fastener, such as shear clips and tension straps 24. A brace panel 102 may be located on one, or both ends of the corresponding header, as seen in FIG. 12. When the brace panel 102 is installed at one end only, a post 26 may be required on an opposing end 110. When the post option is utilized on one end of the header 108, the post 26 may also be connected to the header 108 and the bearing surface 106 with tension straps 112.

In another embodiment, the brace assembly is in a stacked, or multiple story, configuration 300, as seen in FIG. 7. The multi-story configuration attaches stacked panels together and transfers shear and overturning moments from the upper panel to the lower panel. In this embodiment, the brace panel 1 may be installed directly over another brace panel 1. A multi-story kit 22 may be positioned between the two brace panels 1. The lower brace panel member of the configuration 300 may have a ductile anchor assembly 46 located at a top end and a ductile anchor assembly 4 at a bottom end of the panel 1. Attached to the upper ductile anchor assembly 46 and to the lower ductile anchor assembly 47 of the upper brace panel is a steel rod 44 with a compression and tension fit to ductile anchors 46 & 47 as shown in FIG. 8, to create a rigid connection which spans the thickness of the platform framed floor system. The compression and tension fit consist of the threaded rod 44 and a threaded connection on each end such as a compression nut which may be structurally welded to the surface of the ductile anchor 46 or 47. Another tension and compression fit may be the use of a double nut assembly also shown in FIG. 8. As seen in FIG. 8, horizontal shear at the top of the upper lower brace assemblies may be resisted by shear clip 16. Horizontal shear at the base of the upper brace is resisted by "T"-shaped shear clip 42. The shear clips and tension/compression rods and nuts resist imposed shear and overturning moments transferred through the connection assembly.

In another embodiment, seen in FIG. 10, the brace assembly may be utilized in a "tall wall" configuration 400. This configuration 400 may utilize a "stand alone" panel 404 having a length 402 which may be in a range from 12 feet to 30 feet. As opposed to the previously described embodiments, the panel 404 may be constructed absent an upper opening. This embodiment may also be trimmable to address specific height requirements for a structure.

In an embodiment, illustrated in FIGS. 13, 14 and 15, a raised floor kit 500 extends the braced panel 501 bearing condition through the thickness of floor framing over, for example, a concrete foundation (not shown). A block 507 may be a wood-based component and may be constructed from, for example, typical wood-based materials utilized as rim joist. Tension rods 504, located within channels 509, may connect to the braced panel 501 by a nut (not pictured). The connection may be made through the hole (not pictured) in the anchor assembly. A bottom plate 511 may be applied to a bottom surface 513 and may serve to raise or plumb block 507. A top metal plate 515 may be applied between the raised floor kit 500 and the panel assembly and may serve to transfer shear and compression forces through block 507. Rod 504 is connected to anchor rod 548 with coupler 532.

The panel assembly, when subjected to lateral forces in-plane with the panel, utilizes the tension capacity of the tension rod 504 and coupler 532, the tension capacity of anchor bolt (not shown), and the compression capacity of the raised floor block 507, the bottom plate 511, and the top metal plates 515, to resist the overturning shear and moment. Horizontal shear at the base of the brace panel 501 above the raised floor kit 500 is resisted by, for example, a "T"-shaped shear clip 521 and steel plate 515 (shown in FIG. 15).

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. An anchorage assembly comprising:
   side plates constructed from a rigid material having a substantially rectangular shape wherein inner faces of the side plates are substantially parallel;
   a bottom plate constructed from a rigid material and attached to the side plates wherein bottom edges of the side plates contact a top surface of the bottom plate;
   support plates constructed from a rigid material and having a bottom edge that attaches to the top surface of the bottom plate, wherein the support plates have an outer surface that attaches to the inner faces of the side plates so that the support plates are substantially parallel to the side plates;
   a top plate constructed from a rigid material and attached to top edges of the support plates and also attached to the inner faces of the side plates so that the top plate is substantially parallel to the bottom plate;
   wherein the side plates further comprise top edges and the bottom edges of the side plates are not parallel to the top edges of the side plates.

2. The anchorage assembly of claim 1 wherein a width of the side plates is greater than a width of the bottom plate.

3. The anchorage assembly of claim 1 further comprising: mechanical fastener holes within the side plates.

4. The anchorage assembly of claim 1 wherein the side plates and bottom plate form substantially a "U" shape.

5. The anchorage assembly of claim 1 wherein the side plates have a length in a range from 8 inches to 36 inches.

6. The anchorage assembly of claim 1 wherein the bottom edges of the side plates are inclined to form an angle between the bottom plate and a horizontal support structure when attached to said support structure, the angle ranging from 0.01 degrees to 10 degrees.

7. The anchor assembly of claim 1 wherein the side plates each have an inner edge having a first length and an outer edge having a second length, the second length being greater than the first length.

8. A braced wall assembly comprising:
   a panel having a substantially planar and rigid body having a front and rear face the panel having a panel bottom edge; and
   an anchor assembly attached to the panel wherein the anchor assembly fits over the panel bottom edge of the panel, the anchor assembly comprising:
      side plates having inner surfaces which face each other, the side plates attached to a bottom plate to create a periphery that forms substantially a "U" shape;
      a bottom plate constructed from a rigid material and attached to the side plates wherein bottom edges of the side plates contact a top surface of the bottom plate;
      a top plate having opposing edges which attach to the inner surfaces of the side plates; and
      support plates constructed from a rigid material and having a bottom edge that attaches to the top surface of the bottom plate, wherein the support plates have an outer surface that attaches to the inner faces of the side plates so that the support plates are substantially parallel to the side plates;
   wherein inner surfaces of the side plates contact the front and rear face of the panel; and
   wherein the side plates further comprise top edges and the bottom edges of the side plates are not parallel to the top edges of the side plates.

9. The braced wall assembly of claim 8 wherein a width of the side plates is greater than a width of the bottom plate.

10. The braced wall assembly of claim 8 wherein the panel is constructed from an engineered wood product.

11. The anchorage assembly of claim 8 wherein the bottom edges of the side plates are inclined to form an angle between the bottom plate and a horizontal support structure when attached to said support structure, the angle ranging from 0.01 degrees to 10 degrees.

12. The braced wall assembly of claim 8 wherein the side plates each have an inner edge having a first length and an outer edge having a second length, the second length being greater than the first length.

13. A braced wall assembly comprising:

a panel having a substantially planar and rigid body having a front and rear face, the panel having a panel bottom edge; and an anchor assembly attached to the panel wherein the anchor assembly fits over the panel bottom edge of the panel, the anchor assembly comprising:

side plates having inner surfaces which face each other and top edges the side plates are attached to a bottom plate to create a periphery that forms substantially a "U" shape;

the bottom plate constructed from a rigid material and attached to the side plates wherein bottom edges of the side plates contact a top surface of the bottom plate;

a top plate having opposing edges which attach to the inner surfaces of the side plates; and support plates constructed from a rigid material and having a bottom edge that attaches to the top surface of the bottom plate, wherein the support plates have an outer surface that attaches to the inner faces of the side plates;

wherein the side plates have an inner edge and an outer edge and further wherein a length between the top edges and bottom edges of the side plates tapers from the inner edge to the outer edge.

14. The braced wall assembly of claim 13 wherein the panel is constructed from an engineered wood product.

15. The braced wall assembly of claim 13 wherein the side plates have a greater width than the bottom plate.

16. The anchorage assembly of claim 13 wherein the bottom edges of the side plates are inclined to form an angle between the bottom plate and a horizontal support structure when attached to said support structure, the angle ranging from 0.01 degrees to 10 degrees.

* * * * *